(12) United States Patent
Tsiberidis

(10) Patent No.: US 11,458,783 B2
(45) Date of Patent: *Oct. 4, 2022

(54) COMPRESSOR ASSEMBLY

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 426 days.

This patent is subject to a terminal disclaimer.

(21) Appl. No.: 16/462,799

(22) PCT Filed: Nov. 24, 2017

(86) PCT No.: PCT/EP2017/080388
§ 371 (c)(1),
(2) Date: May 21, 2019

(87) PCT Pub. No.: WO2018/096110
PCT Pub. Date: May 31, 2018

(65) Prior Publication Data
US 2019/0366785 A1    Dec. 5, 2019

(30) Foreign Application Priority Data

Nov. 24, 2016  (DE) ...................... 10 2016 122 737.4

(51) Int. Cl.
*B60C 23/12* (2006.01)
*B60C 23/00* (2006.01)

(52) U.S. Cl.
CPC .......... *B60C 23/127* (2020.05); *B60C 23/004* (2013.01); *B60C 23/137* (2020.05)

(58) Field of Classification Search
CPC ..... B60C 23/12; B60C 23/004; B60C 23/127; B60C 23/137
See application file for complete search history.

(56) References Cited

U.S. PATENT DOCUMENTS

| | | | |
|---|---|---|---|
| 648,408 A | 5/1900 | Hayes |
| 652,997 A | 7/1900 | Crandall |
| 655,797 A | 8/1900 | Reason |
| 797,447 A | 8/1905 | Merry |
| 1,713,899 A | 5/1929 | Gray |
| 2,317,636 A | 4/1943 | Parker |

(Continued)

FOREIGN PATENT DOCUMENTS

| | | |
|---|---|---|
| CA | 2226493 | 7/1996 |
| CN | 85105176 A | 12/1986 |

(Continued)

*Primary Examiner* — Jason R Bellinger
*Assistant Examiner* — Emily G. Castonguay
(74) *Attorney, Agent, or Firm* — Pauley Erickson & Swanson

(57) ABSTRACT

The invention relates to a compressor assembly for supplying pressure medium to a tire cavity of a vehicle wheel that can be mounted on a wheel hub which can be mounted on a wheel carrier so as to be rotatable about an axis of rotation. The compressor assembly includes a wheel mount-side transmission component including a cylindrical cam.

24 Claims, 19 Drawing Sheets

(56) References Cited

U.S. PATENT DOCUMENTS

| | | | |
|---|---|---|---|
| 2,506,677 A | 5/1950 | McKenna | |
| 5,052,456 A | 10/1991 | Dosjoub | |
| 5,325,902 A * | 7/1994 | Loewe | B60C 23/004 152/418 |
| 5,505,080 A | 4/1996 | McGhee | |
| 6,345,650 B1 | 2/2002 | Paasch et al. | |
| 6,736,170 B2 | 5/2004 | Eriksen et al. | |
| 6,994,136 B2 * | 2/2006 | Stanczak | B60C 23/004 152/418 |
| 7,237,590 B2 | 7/2007 | Loewe | |
| 7,581,576 B2 * | 9/2009 | Nakano | B60C 23/12 152/419 |
| 7,760,079 B2 | 7/2010 | Isono | |
| 7,891,393 B1 | 2/2011 | Czarno | |
| 8,052,400 B2 * | 11/2011 | Isono | F04B 35/00 417/233 |
| 9,151,288 B2 * | 10/2015 | Richardson | B60C 23/00 |
| 9,457,772 B2 | 10/2016 | Paasch | |
| 2007/0151648 A1 | 7/2007 | Loewe | |
| 2010/0039143 A1 | 3/2010 | Wang | |
| 2013/0251552 A1 | 9/2013 | Richardson | |
| 2013/0269514 A1 | 10/2013 | Sato et al. | |
| 2014/0096881 A1 | 4/2014 | Loewe | |
| 2015/0101723 A1 | 4/2015 | Keeney et al. | |
| 2015/0191058 A1 | 7/2015 | van Wyk Becker et al. | |
| 2016/0250902 A1 | 9/2016 | Becker | |
| 2016/0288591 A1 | 10/2016 | Becker | |
| 2016/0288592 A1 | 10/2016 | Becker | |
| 2017/0113500 A1 | 4/2017 | Gau et al. | |
| 2019/0023091 A1 | 1/2019 | Spindler et al. | |
| 2019/0308472 A1 | 10/2019 | Tsiberidis | |
| 2019/0366785 A1 | 12/2019 | Tsiberidis | |
| 2020/0055351 A1 * | 2/2020 | Tsiberidis | B60C 23/004 |
| 2020/0070450 A1 | 3/2020 | Tsiberidis | |

FOREIGN PATENT DOCUMENTS

| | | |
|---|---|---|
| CN | 86105562 A | 2/1988 |
| CN | 2188661 Y | 2/1995 |
| CN | 2202665 Y | 7/1995 |
| CN | 2252128 | 4/1997 |
| CN | 101104374 | 1/2008 |
| CN | 101120170 A | 2/2008 |
| CN | 201061989 Y | 5/2008 |
| CN | 201082666 | 7/2008 |
| CN | 101312821 A | 11/2008 |
| CN | 101696681 | 4/2010 |
| CN | 202439521 U | 9/2012 |
| CN | 102781653 A | 11/2012 |
| CN | 102791954 A | 11/2012 |
| CN | 103459843 A | 12/2013 |
| CN | 103465736 A | 12/2013 |
| CN | 205044451 U | 2/2016 |
| CN | 105408135 A | 3/2016 |
| DE | 41 33 039 A1 | 4/1993 |
| DE | 20 2014 010 520 U1 | 12/2015 |
| DE | 10 2015 115642 A1 | 3/2017 |
| EP | 1 881 197 A1 | 1/2008 |
| EP | 2 828 103 B1 | 1/2015 |
| JP | H11139118 A | 5/1999 |
| JP | 2007 039013 A | 2/2007 |
| WO | WO 2010/146373 A1 | 12/2010 |
| WO | WO 2015/063679 A1 | 5/2015 |
| WO | WO 2015/075655 A1 | 5/2015 |
| WO | WO 2016/178137 A1 | 11/2016 |
| WO | WO 2018/096108 A1 | 5/2018 |
| WO | WO 2018/096109 A1 | 5/2018 |
| WO | WO 2018/096111 A1 | 5/2018 |
| WO | WO 2018/096112 A1 | 5/2018 |

* cited by examiner

COMPRESSOR ASSEMBLY

BACKGROUND OF THE INVENTION

Field of the Invention

The invention relates to a compressor assembly for supplying a pressure medium to a tire cavity of a tire.

Discussion of Related Art

The tire cavity of the tire is part of a vehicle tire that can be mounted on a wheel hub, wherein the wheel hub can be mounted on a wheel mount such that it can rotate about an axis of rotation.

In order to inflate a tire cavity of a vehicle tire with a pressure medium, such as compressed air, it is known to provide a tire valve on a vehicle wheel, via which the pressure medium can be introduced into the tire cavity. With vehicles such as passenger cars, trucks or utility vehicles, tire valves are normally located in the vicinity of a wheel rim on which the tire is mounted such that they are readily accessible from the outside.

An external pressure medium source can be connected to the tire valve by means of a hose in order to thus be able to control, and potentially correct, the tire pressure, in particularly manually.

Vehicle-side pressure medium supply systems are also known that enable an autonomous inflation of the tire cavity in a vehicle tire with a pressure medium. For this, it is known to provide pressure medium lines to the wheels from a central pressure medium source on the vehicle, e.g. a compressor or a pressure accumulator, that lead into the tire cavity. In the transition from non-rotating components on the vehicle, e.g. the wheel mount, to the wheels that rotate when the vehicle is in operation, so-called rotary feedthroughs are implemented, which also enable an inflation with the pressure medium while driving, i.e. when the wheels are turning. In this manner, the tire pressure can be adjusted to changes in loads, driving surfaces, and ambient temperatures, or leakages can be compensated for, e.g. via diffusion.

One problem with the known systems is that with external pressure medium sources, they must each be maintained, and the pressure in all of the tire cavities must be checked extensively. With the known vehicle-side pressure medium sources, which supply the pressure medium to the tire cavities via rotary feedthroughs, the operational reliability of the rotary feedthroughs for the pressure medium poses a problem. The rotary feedthroughs can only be made robust and durable with a great deal of effort, such that they last as long as a vehicle, which turns out to be expensive and uneconomical.

SUMMARY OF THE INVENTION

The object of the present invention is to create a compressor assembly that reliably and with little maintenance ensures an inflation of the tire cavity with a pressure medium over the entire service life of the vehicle.

The compressor assembly preferably functions automatically. "Automatically" means that it is not necessary to stop and use an external pressure medium source. The operation of the compressor assembly according to the invention can be initiated autonomously, however, i.e. via an arbitrary regulator or control assembly in the vehicle, or in response to a control signal by a vehicle driver.

The compressor assembly according to the invention is characterized in that the compressor assembly comprises at least one compression chamber on the hub, the volume of which can be altered by a translatory movement of a compressor component, wherein a pressure medium that is to be conducted into the tire cavity can be compressed by a reduction in the volume of the compression chamber, and wherein the compressor assembly comprises a transmission, preferably a cam mechanism, which is configured to convert a rotational movement between the wheel mount and the wheel hub into an oscillating translatory movement of the compressor component through an interaction of a wheel mount-side transmission component with a hub-side transmission component, wherein the transmission component on the wheel mount comprises a cylindrical cam.

Such a compressor assembly has the advantage that it can be very robust, due to its purely mechanical construction. Because the compression chamber is located on the hub, the pressurized pressure medium is provided directly to a rotating part of the vehicle wheel, such that a rotary feedthrough for the pressure medium is not necessary. In other words, the pressure medium is supplied directly to the location where it is needed, i.e. the rotating tire cavity.

Rotary feedthroughs for a pressure medium are difficult to design and it is difficult to make them reliable and functional in a durable manner. It is also difficult to create such pressure medium rotary feedthroughs due to the adverse conditions in the vicinity of the vehicle wheel, because this area is prone to contaminants and impact-related loads. The compressor assembly according to the invention allows for a pressure medium to always be available with sufficient pressure when driving the vehicle in which the compressor assembly is installed, thus ensuring that the tire can always be sufficiently inflated.

It is advantageous when the translatory movement of the compressor component takes place at least partially in the direction of the axis of rotation, preferably entirely in the direction of the axis of rotation. As a result, the compressor assembly can be made such that it is particularly space-saving in the radial direction, thus orthogonal to the direction of the axis of rotation, while still exhibiting a large volume in the compression chamber.

In the context of the present invention, the hub side and hub-side components are components that are located on the hub for conjoint rotation therewith. These components are thus connected directly or indirectly to the hub, such that they rotate with the hub when the hub rotates in relation to the wheel mount. The wheel mount does not move in relation to the vehicle. The wheel mount side and wheel mount-side components do not rotate in relation to the wheel mount. When the wheel or the wheel hub rotates, there is a relative rotational movement between the wheel mount-side components, e.g. passenger compartment of the vehicle, and the wheels or tires, the wheel hub, and the other hub-side components.

The wheel mount-side transmission component is thus non-rotatably connected to the wheel mount-side components when installed in the vehicle. When the vehicle is operated, no part of the wheel mount-side transmission component rotates. Only the hub-side components rotate; in particular the hub-side transmission component rotates entirely about the axis of rotation.

The hub-side transmission component always rotates conjointly with the hub-side components that rotate when the vehicle is in operation. The wheel mount-side transmission component is then non-rotatably connected to the vehicle, or the wheel mount-side components, when the compressor assembly is in operation, and preferably at all times.

The wheel mount-side transmission component is preferably entirely rigid and stationary, such that it cannot move in either a rotary or translatory manner, in relation to the wheel mount.

There is preferably one compressor assembly on each wheel of the vehicle, such that all of the wheels of the vehicle are always supplied with sufficient pressure in their respective tire cavities. Because each wheel thus comprises its own pressure medium supply, rotary feedthroughs for supplying a pressure medium are superfluous.

The subject matter of the present invention also relates to a vehicle in which the compressor assembly described herein is installed.

It is of particular advantage when the wheel mount-side transmission component comprises a groove-like cam track.

By providing a groove-like cam track on the wheel mount-side transmission component, it is possible to implement a form fitting guidance of the hub-side transmission component in a simple manner, by means of which a continuously controlled conversion of the rotational movement between the wheel mount-side components and the hub-side components that rotate conjointly with the wheel is ensured.

In a preferred embodiment, the compressor assembly is designed such that the hub-side transmission component comprises a pin-like engagement element for engaging in the cylindrical cam, preferably in the groove-like cam track. Such an embodiment of the hub-side transmission component allows for an effective transfer of forces and a movement conversion between the hub-side transmission component and the wheel mount-side transmission component.

In another preferred embodiment of the compressor according to the invention, the hub-side transmission component comprises an engagement element that engages in the cylindrical cam, wherein the engagement element has a cross section at its end facing the wheel mount-side transmission component, the extension of which becomes broader in the radial direction. This enables a pressureless and basically sliding engagement of the engagement element in the cylindrical cam of the wheel mount-side transmission component.

Another preferred embodiment of the compressor assembly according to the invention is characterized in that the cylindrical cam has at least one curved surface, which runs in at least a portion of its curvature toward the axis of rotation, viewed in the radial direction of its curvature.

The curved surface formed in this manner enables a smooth coupling of the hub-side transmission component to the wheel mount-side transmission component. The combination of the curved surface with the engagement element that has the broadened cross section, as described above, is particularly preferred.

It is also preferred that the wheel mount-side transmission component comprises a groove-like cam track, wherein the cam track has two opposing curved surfaces, each of which runs in at least a portion of its curvature toward the axis of rotation, viewed in the radial direction of its curvature. In addition to a smooth coupling, curved surfaces of this type also result in a self-centering effect of the wheel mount-side transmission component in interacting with the hub-side transmission component. The engagement of the hub-side transmission component in the cam track described above basically forces the hub-side transmission component into the correct engagement position.

An embodiment in which the compressor component comprises an annular piston is also preferred.

By this means, a maximum possible delivery rate is obtained with a minimum space requirement, because with this embodiment, the entire circumferential extension of the annular piston can be used for the compression chamber.

An embodiment characterized in that there is a compression chamber located in front of and behind a contact section of the hub-side transmission component with the cylindrical cam, seen along the axis of rotation, is also advantageous. This provides for a high delivery rate. Because the compressor component executes an oscillating translatory movement, the back and forth movement in this embodiment can be used for conveying a pressure medium.

Another preferred embodiment is characterized in that the wheel mount-side transmission component is located radially inward from the hub-side transmission component.

As a result, the wheel mount-side transmission component can be connected in a simple, space-saving manner, to the wheel mount, and the hub-side transmission component can be located in a space-saving manner surrounding the wheel mount-side transmission component. This embodiment has advantages, in particular in combination with the compressor component in the form of an annular piston, because the annular piston in this exemplary embodiment can also be located radially outward from the wheel mount-side transmission component in a structurally simple manner, thus resulting in a large circumferential surface available for the annular piston.

It is also possible to locate the wheel mount-side transmission component radially outward from the hub-side transmission component. As a result, a connection for a coupling mechanism can also be centrally located.

Furthermore, an embodiment characterized in that the hub-side transmission component is pretensioned in a position in which it does not interact with the wheel mount-side transmission component is also advantageous. This ensures that the compressor assembly according to the invention is only operated when a pressure medium is needed in the tire cavity. For this, the hub-side transmission components can be brought into engagement with the wheel mount-side transmission component via a trigger. When it is not triggered, the hub-side transmission component returns to its position in which it does not interact with the wheel mount-side transmission component. As a result, the motor vehicle can continue to be operated without additional energy expenditures. This eliminates wear to the compressor assembly when the compressor assembly is not in use.

An embodiment in which the hub-side transmission component can be moved to a position pneumatically, magnetically, electrically, or electromechanically, in which it interacts with the wheel mount-side transmission component, is also advantageous. As a result, the compressor assembly can be operated if necessary with a simple trigger. The pneumatic movement of the hub-side transmission component is particularly preferred.

It is preferred that the hub-side transmission component can be moved to a position by a, preferably exclusively, radial translatory movement, in which it interacts with the wheel mount-side transmission component. The hub-side transmission component can then be actuated simply by pneumatic or magnetic means.

It is likewise advantageous when the hub-side transmission component can be moved to a position by a, preferably exclusively, radial rotational movement, in which it interacts with the wheel mount-side transmission component. The hub-side transmission component can then be actuated simply by pneumatic or magnetic means. This has the advantage that the hub-side transmission component only has to move a short distance. In particular, a design of the hub-side transmission component with a plate-like engagement section for engaging in the wheel mount-side transmission component is particularly advantageous in this exemplary embodiment. The plate-like engagement section can be oriented such that its plate-like extension is basically parallel to the substantial curvature of the cylindrical cam when the compressor assembly is in a deactivated position, and the compressor assembly is rotated to an operating position in which the engagement section is substantially orthogonal to the curvature of the cylindrical cam, when in operation.

It is advantageous when the compressor assembly comprises two hub-side transmission components that are diametrically opposed in relation to the axis of rotation. By this means, the movement conversion can take place in a particularly smooth manner. The two opposing hub-side transmission components can preferably be actuated pneumatically via a shared compression chamber, such that they can be moved to a position in which they interact with the wheel mount-side transmission component.

It is advantageous when the compressor assembly comprises a coupling mechanism, by means of which the hub-side transmission component can be brought into interaction with the wheel mount-side transmission component. The compressor assembly can be activated in a simple manner as needed.

It is advantageous when the coupling mechanism is configured such that the hub-side transmission component is pretensioned in a position in which it does not interact with the wheel mount-side transmission component. The compressor assembly then automatically returns to a deactivated position due to the tension.

The coupling mechanism is preferably pneumatic, and can be actuated such that a pressure accumulator or pressure from the tire cavity can then be used for the coupling.

The coupling mechanism can thus be actuated, preferably by means of the pressure medium in the tire cavity.

It is advantageous when there is a coupling valve that forms a fluid connection between the coupling mechanism and the tire cavity, against which the pressure medium in the tire cavity bears, and which opens when the tire pressure falls below a tire pressure threshold value, by means of which the coupling mechanism is actuated by means of the pressure medium in the tire cavity, and the hub-side transmission component interacts with the wheel mount-side transmission component. An automatic inflation of the tire is ensured by this means. In other words, when the pressure in the tire cavity falls below the pressure threshold value, the coupling valve is opened, and the pneumatically actuatable hub-side transmission component is moved to a position in which it interacts with the wheel mount-side transmission component, by means of which the compressor component begins its oscillating translatory movement, and the compressor assembly starts to convey a pressure medium from the compression chamber to the tire cavity.

It is advantageous that the coupling valve closes when a tire pressure target value is exceeded, which is preferably higher than the tire pressure threshold value, such that the coupling mechanism is no longer subjected to the pressure medium, preferably wherein the coupling valve or a relief valve lets air out of the coupling mechanism when the tire pressure target value is exceeded. As a result, the compressor assembly shuts down automatically and quickly. It is particularly preferred that there is a difference between the tire pressure threshold value and the target pressure, thus the target pressure is higher than the tire pressure threshold value. As a result, the opening of the coupling valve exhibits a certain hysteresis. By way of example, the coupling valve can open when the pressure value falls below a value x, and then close when the tire pressure is higher than a value 1, 1x.

It is advantageous when the compressor assembly comprises a mechanism for measuring and/or indicating the pressure, the temperature, and/or the moisture of the pressure medium in the tire cavity, which can preferably be connected to the tire cavity via the pressure medium line. The compressor assembly is connected as a matter of course to the tire cavity, and can thus supply measurement data regarding the state of the pressure medium in the tire cavity in a simple manner.

It is advantageous when the compressor assembly is connected to a filter at the pressure medium side. As a result, a malfunctioning of the compressor assembly do to contamination can be prevented.

It is advantageous when the compressor assembly is configured to use the pressure medium from the tire cavity or by conveying the pressure medium through the compressor assembly to clean the filter. The compressor assembly that has a filter is thus basically a self-cleaning unit.

BRIEF DESCRIPTION OF SEVERAL VIEWS OF THE DRAWINGS

Further features, application possibilities and advantages of the invention can be derived from the following description of exemplary embodiments of the invention, which shall be explained in reference to the drawings, wherein the features may be substantial to the invention in and of themselves as well as in different combinations, without this necessarily being indicated explicitly.

Corresponding components and elements have the same reference symbols in the figures.

DETAILED DESCRIPTION OF THE INVENTION

Figure 1:
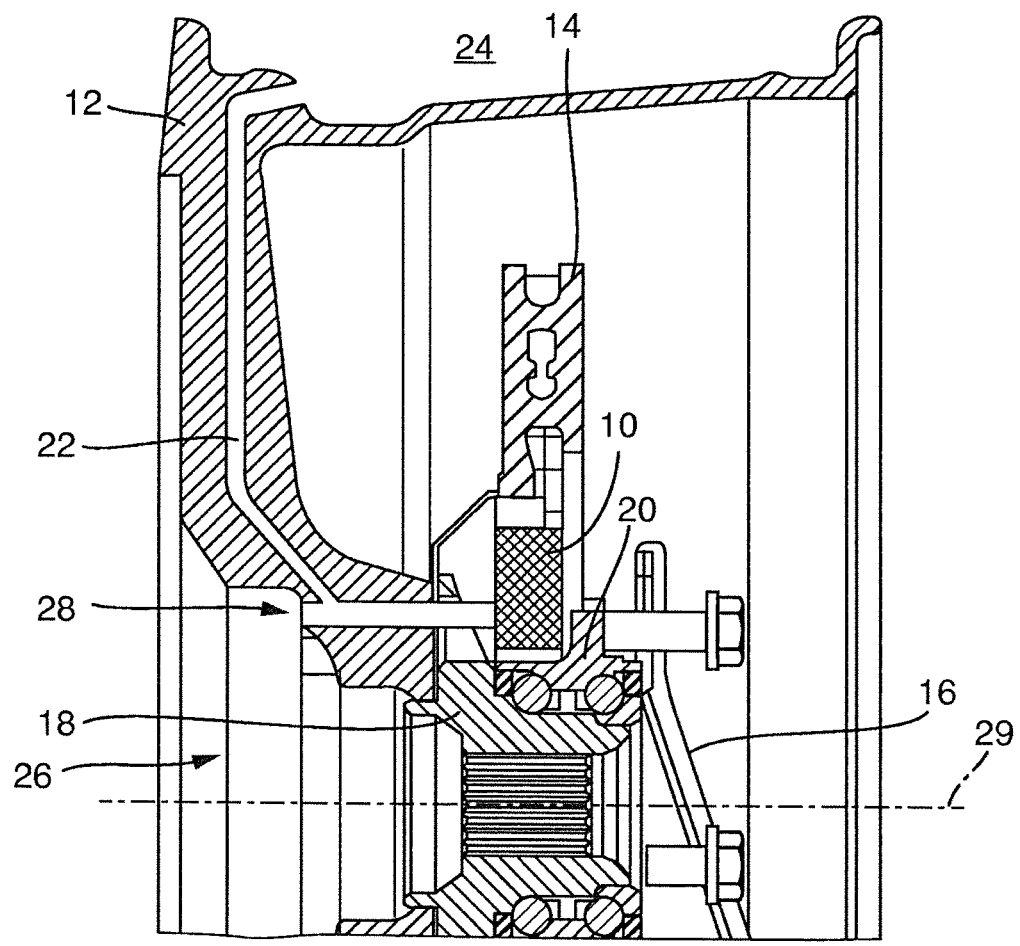
FIG. 1 shows a compressor assembly according to the invention, in the installed state, in a schematic illustration.

The installation position of a compressor assembly 10 according to the invention is shown schematically in FIG. 1.

The compressor assembly is only indicated schematically in FIG. 1 by the cross-hatched region.

A wheel rim is indicated by the reference symbol 12. A brake disk has the reference symbol 14, a wheel mount has the reference symbol 16, a wheel hub has the reference symbol 18, and a wheel bearing has the reference symbol 20.

A pressure medium line 22 extends from the compressor assembly 10 to the tire cavity 24. The tire itself is not shown in FIG. 1.

The rim has a schematically illustrated connection 28 in the vicinity of a tire hub mount 26 through which a sealing medium is supplied. The connection 28 is optional.

An axis of rotation 29 is indicated by a broken line, and has the reference symbol 29. In the embodiment shown in FIG. 1, the pressure medium line 22 extends through the material of the rim 12. Advantageously, a section of the pressure medium line 22 is obtained through a hollow brake disk securing screw in the brake disk 14.

A compressor assembly in combination with a generic rim in which the pressure medium line 22 extends at least in part through the material of the rim 12 is likewise an independent invention as set forth in this application.

Figure 2:
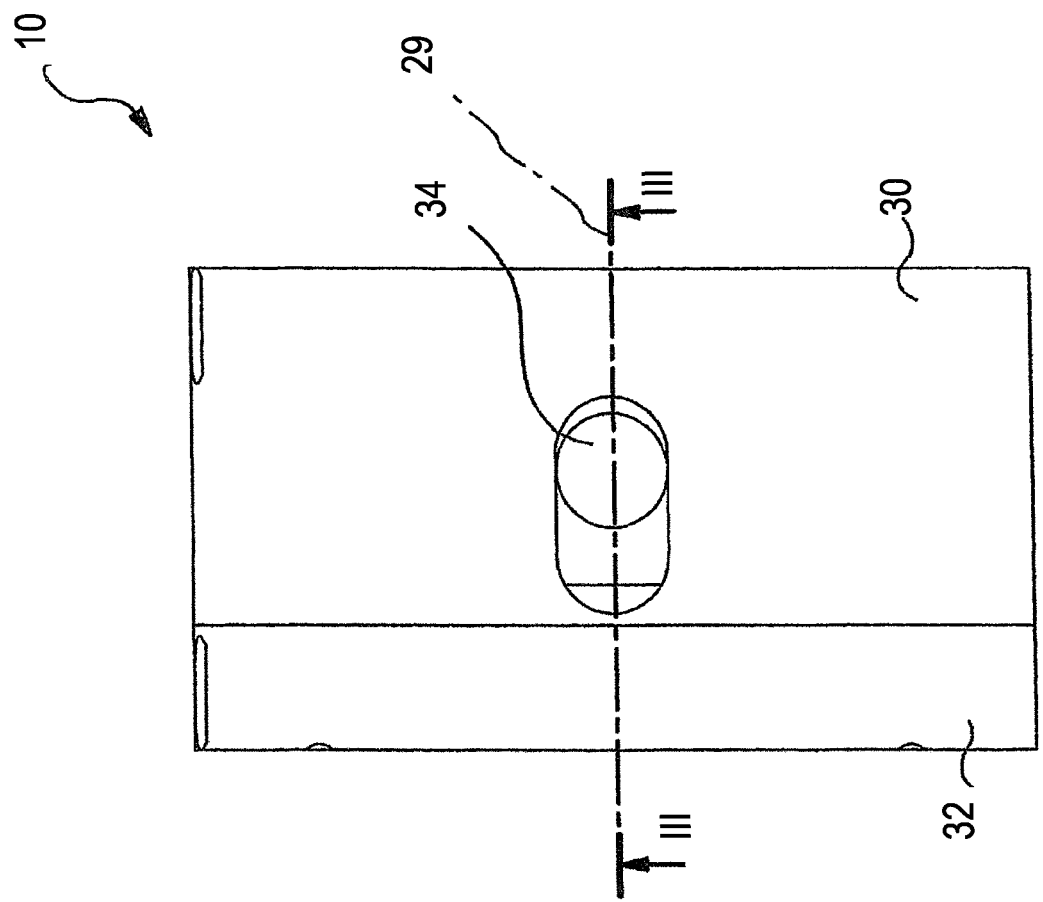
FIG. 2 shows a compressor assembly according to an embodiment of the invention.

FIG. 2 shows a first embodiment of a compressor assembly 10 according to the invention, in a side view. The compressor assembly 10 comprises a first hub-side housing component 30 and a second hub-side housing component 32.

Figure 3:
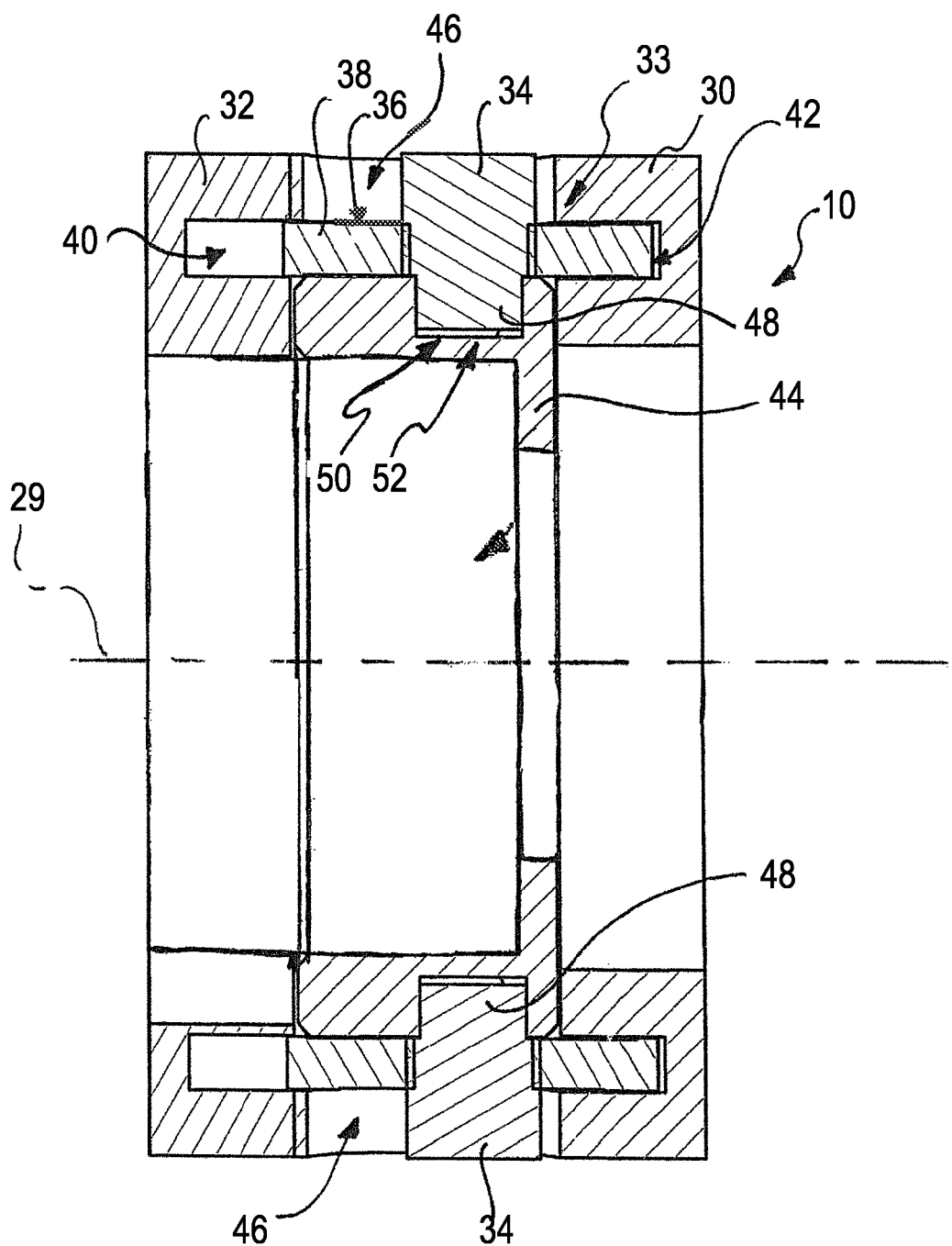
FIG. 3 is a sectional view of the compressor assembly of FIG. 2.

The compressor assembly 10 shown in FIG. 2 is illustrated in FIG. 3, cut along the axis of rotation 29 viewed in the direction of the arrow III.

A transmission is indicated by the reference symbol 33, and is in the form of a cam mechanism. A hub-side transmission component is indicated by the reference symbol 34. It can be seen in FIG. 3 that the compressor assembly 10 has numerous hub-side transmission components 34. An annular piston 38 is connected to the hub-side transmission components 34, which forms a compressor component 36. The hub-side transmission component 34 forms a tappet output drive of the transmission 33 through its linearly guided bearing.

The compressor component 36 in the form of an annular piston 38 is adjacent to a first compression chamber 40 and a second compression chamber 42.

The hub-side transmission components 34 are engaged with a wheel mount-side transmission component 44 such that they can interact therewith. The hub-side transmission components 34 are supported in the first hub-side housing component in slot-like recesses 46. Because they are supported in slot-like recesses 46, the hub-side transmission components 34 can be moved only in the direction of the axis of rotation 29 in a translatory manner in relation to the first hub-side housing component 30.

The hub-side transmission components 34 are engaged with the wheel mount-side transmission component 44, as specified above. The engagement sections 48 of the respective hub-side transmission components 34 engage in a cam track 50 located on the wheel mount-side transmission component. The cam track 50 is an embodiment of a cylindrical cam 52.

Figure 4:
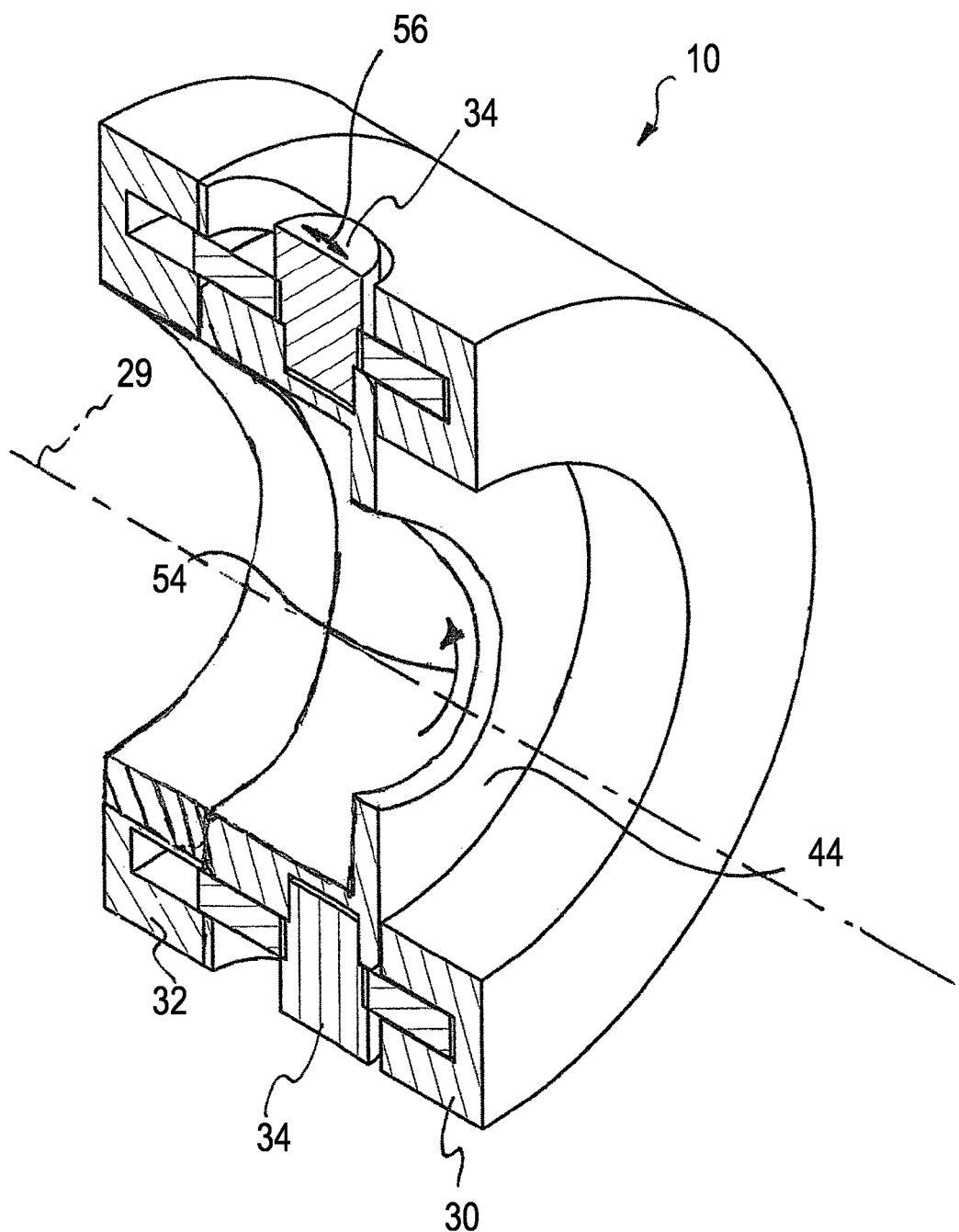
FIG. 4 is a perspective view of the sectional view of FIG. 3.
Figure 5:
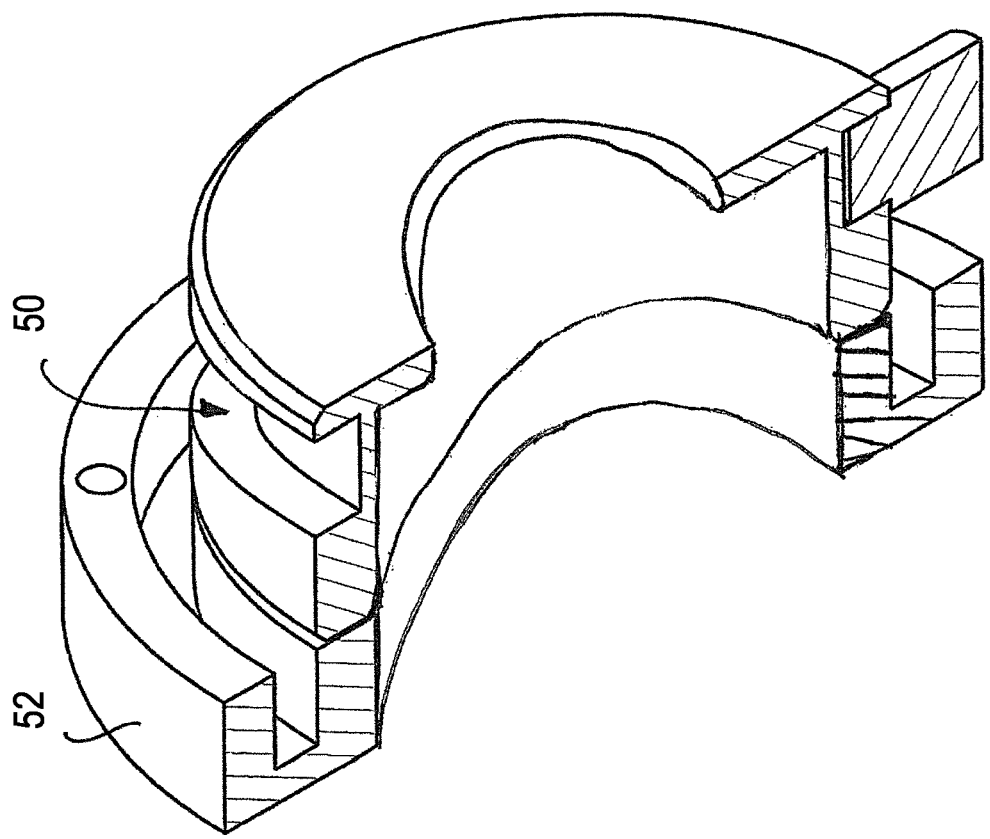
FIG. 5 is a partial section view of the compressor assembly of FIG. 2.

The compressor assembly shown in FIGS. 2 and 3 is shown in FIG. 4 in a perspective, cutaway view, and in FIG. 5 in a perspective illustration similar to FIG. 4, wherein in FIG. 5, only one of the hub-side transmission components 34 is shown, and the annular piston 38 as well as the second hub-side transmission component 34 and the first hub-side housing component 30 are not shown. As a result, the curve of the cam track 50 can be clearly seen in FIG. 5.

The manner of operating the compressor assembly 10 is illustrated in FIG. 4. A rotational relative movement between the wheel mount-side transmission component 44 and the hub-side components is indicated by a curved arrow with the reference symbol 54. Because the cam track 50 changes its position toward the axis of rotation 29 over its circumferential curvature, and the wheel mount-side transmission component 44 is prevented from making a translatory movement along the axis of rotation 29 in relation to the hub-side components, the hub-side transmission components 34 move back and forth, due to the rotation of the wheel mount-side transmission component 44, along the axis of rotation 29 in the direction indicated by a double arrow 56.

Figure 6:
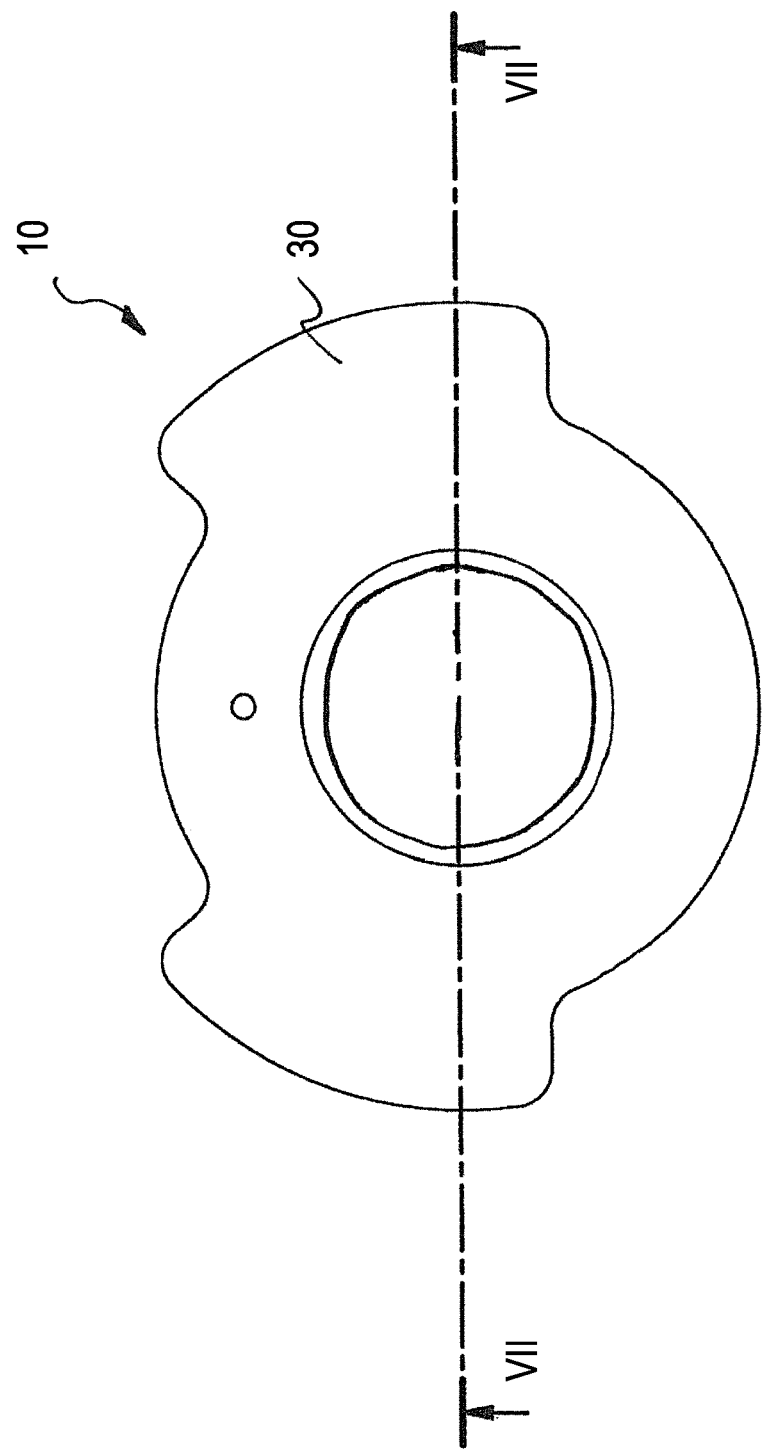
FIG. 6 shows a compressor assembly according to an embodiment of the invention.

FIG. 6 shows an alternative embodiment of a compressor assembly according to the invention.

Figure 7:
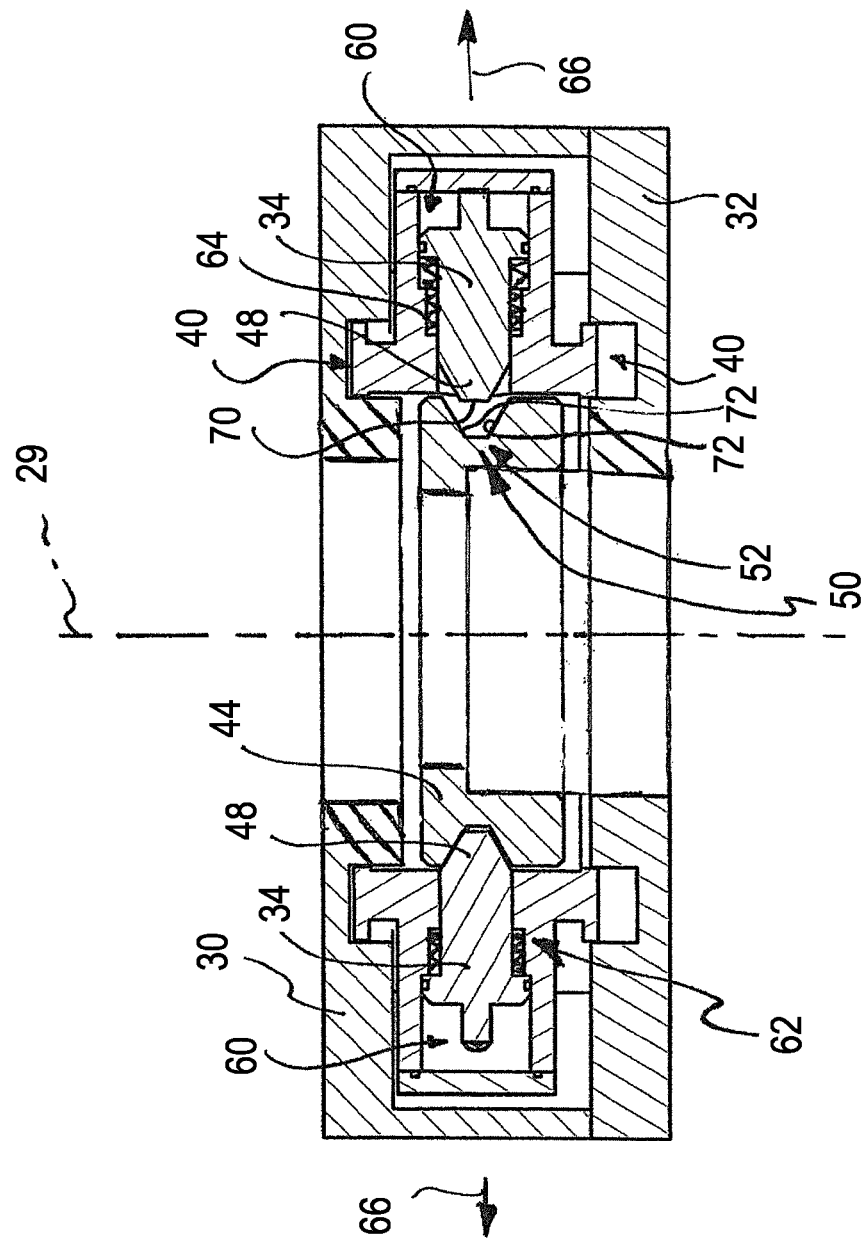
FIG. 7 is a sectional view of the compressor assembly of FIG. 6.
Figure 8:
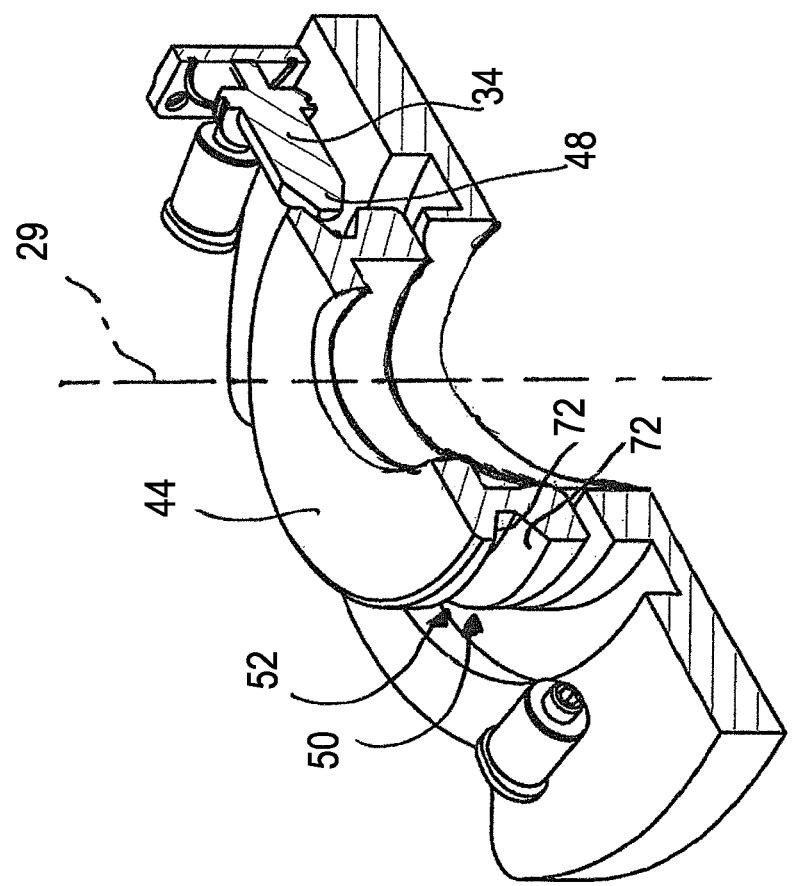
FIG. 8 is a perspective view of the sectional view of FIG. 7.

The embodiment according to FIGS. 6 to 8 differs from the preceding embodiment in FIGS. 1 to 5 in that the hub-side transmission components 34 can be coupled to the wheel mount-side transmission component 44. In order to couple the hub-side transmission components 34 to the wheel mount-side transmission component 44, a transmission component-side pressure medium chamber 60 is supplied with a pressure medium, by means of which the hub-side transmission components 34 are moved toward the wheel mount-side transmission component 44. The hub-side transmission components 34 and the transmission component-side pressure medium chamber 60 form part of a coupling mechanism 62.

If the transmission component-side pressure chambers are no longer subjected to a pressure medium, the hub-side transmission components 34 return to their pretensioned positions, as shown on the right-hand side of FIG. 7, because they are each pretensioned to this position by a compression spring 64.

The hub-side transmission component 34 shown on the left in FIG. 7 is engaged with the wheel mount-side transmission component 44, and interacts therewith. In order to be brought into engagement with the wheel mount-side transmission component 44, the hub-side transmission components 34 thus move radially 66 toward the wheel mount-side transmission component 44.

The hub-side transmission components 34 have a cross section at their ends 70 facing the wheel mount-side transmission component, the extension of which broadens, viewed in the radial direction 66.

The cam track 50, formed by the cam groove, has two curved surfaces 72, wherein both curved surfaces 72 run toward the axis of rotation, seen from the radial perspective. This means that they do not run exactly in the radial direction 66 in the cutaway view shown in FIG. 7, thus in a section cut along the radial direction 66. In other words, the bore of the cam track 50 rises radially outward.

As a result of the roughly inclined shape of the cam track 50 described above, and the engagement section 48 of the hub-side transmission component 34, it is possible to smoothly couple and decouple the hub-side transmission components 34 in the wheel mount-side transmission component 44.

Figure 9:
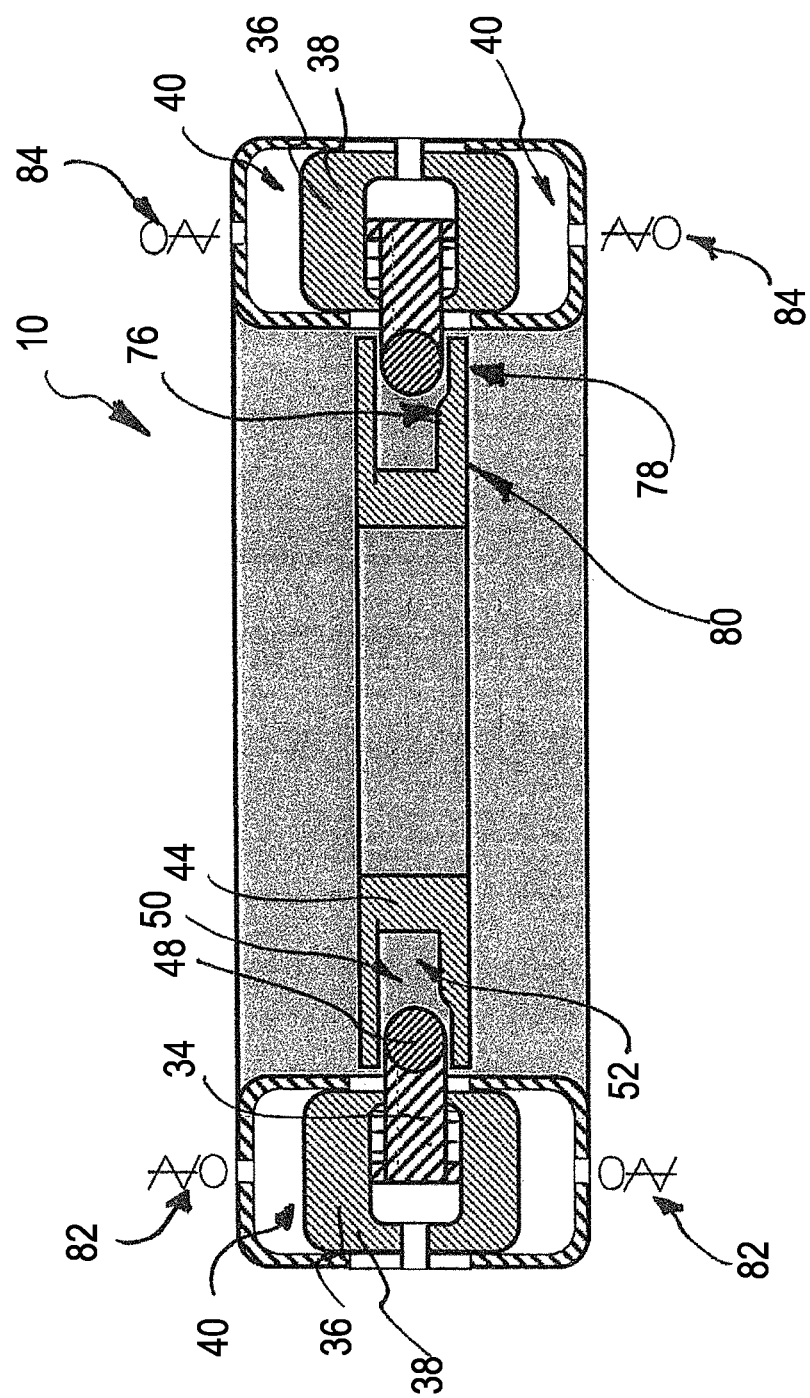
FIGS. 9 to 12 illustrate a compressor assembly according to another embodiment of the invention.
Figure 10:
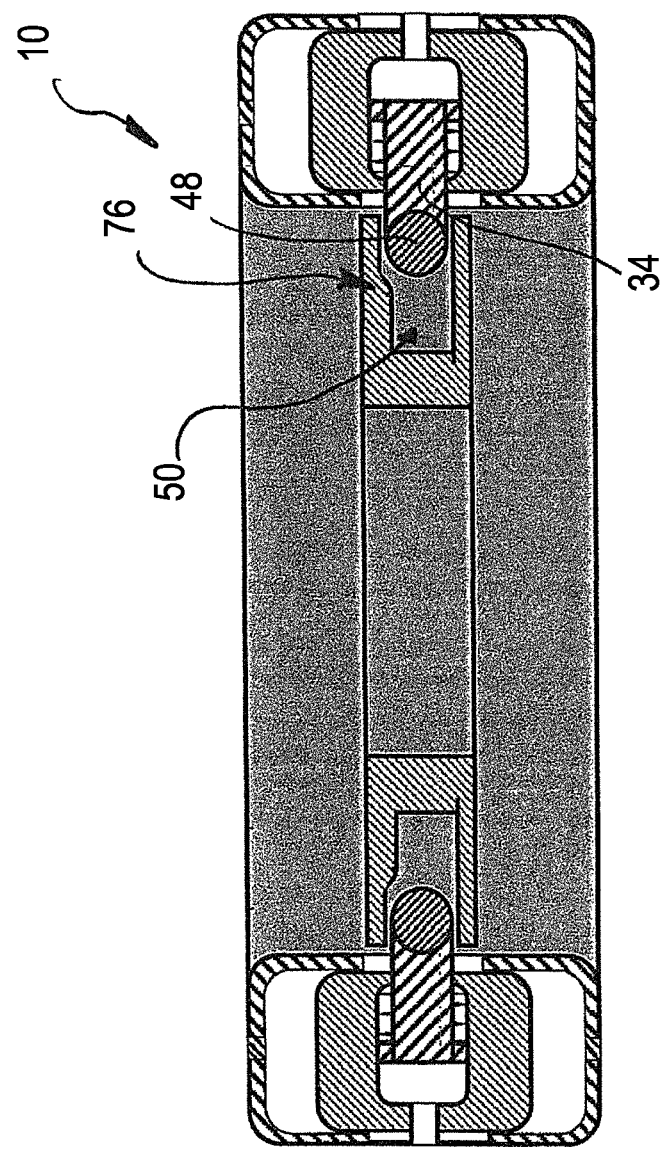

FIGS. 9 and 10 show an alternative embodiment of the compressor assembly 10. In this embodiment, the hub-side transmission components 34 are in the shape of a pin with a rotating spherical engagement element 48.

The wheel mount-side transmission component 44 comprises a cylindrical cam 52 in the form of a cam track 50. The cam track has a stepped section 76. The stepped section 76 is not a distinct step, but instead forms a smooth transition from a first broadened region 78 to a narrower guiding region 80 of the cam track.

As is shown particularly well in FIG. 9, the annular compression chamber 40 has non-return valves. A first type of non-return valves 82 are located in relation to the compression chamber 40 such that when the annular piston moves in a conveying direction, air can escape, while a second type of non-return valves 84 are located such that in the compression chamber 40 can be suctioned in when the annular piston is moved in a drawing direction.

FIG. 10 shows the compressor assembly 10 in FIG. 9 in a perspective rotated 90° about the circumference. When rotated 90°, the stepped section 76 is no longer on the lower surface of the cam track 50, but instead on the upper surface. In the angles between these two perspectives shown in FIGS. 9 and 10, the stepped section 76 is less pronounced on both the upper and lower surfaces of the cam track 50, in order to reliably ensure a smooth coupling of the hub-side transmission components.

Figure 11:
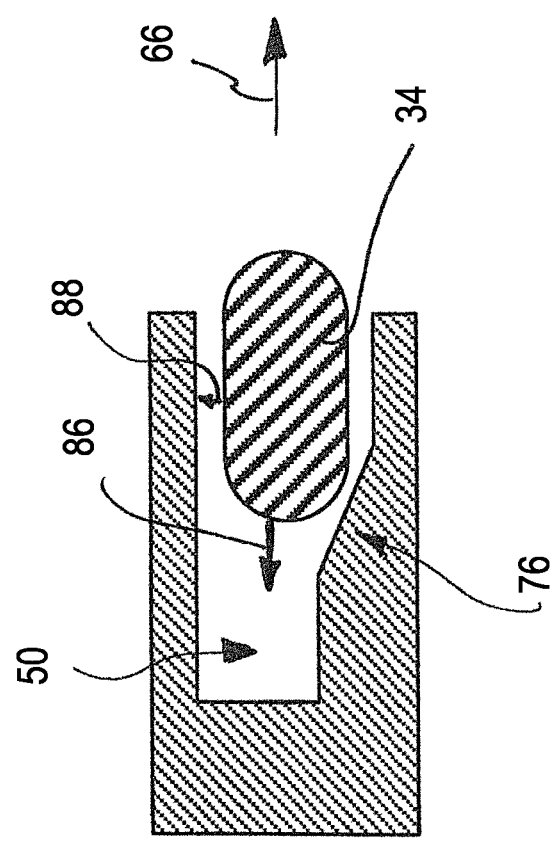
Figure 12:
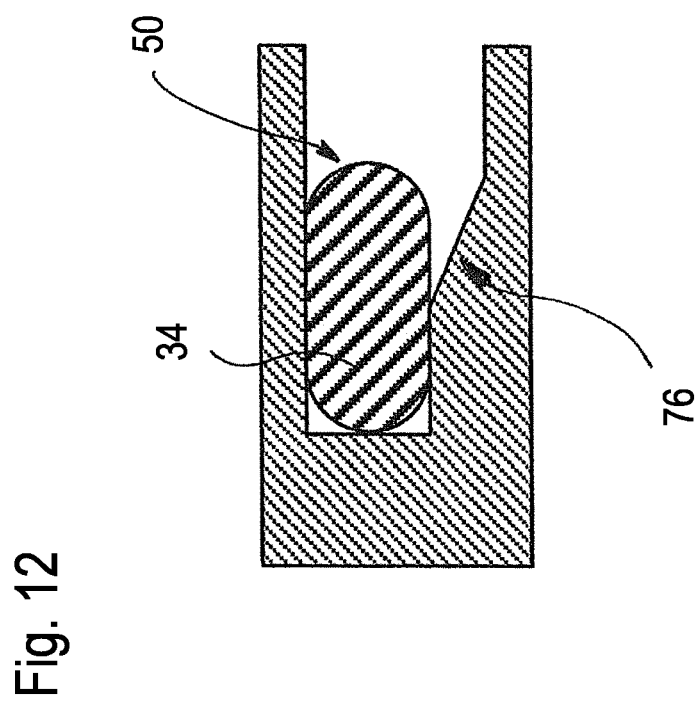

The coupling procedure for the hub-side transmission components 34 in the cam track 50 is schematically illustrated in FIGS. 11 and 12.

The coupling movement of the hub-side transmission component 34 is symbolically indicated by an arrow 86. As a result of the radially inward movement of the hub-side transmission component 34, the hub-side transmission component 34 is also moved toward the axis of rotation, in addition to the radial inward movement 86, as is indicated by an arrow with the reference symbol 88.

This results in a movement of the annular piston 38. The subsequent movement of the hub-side transmission component 34 caused by the rotational relative movement of the wheel mount-side transmission component 44 in relation to the hub-side transmission component 34 is transferred to the annular piston 38, conveying the pressure medium out of the compression chamber 40.

Figure 13:
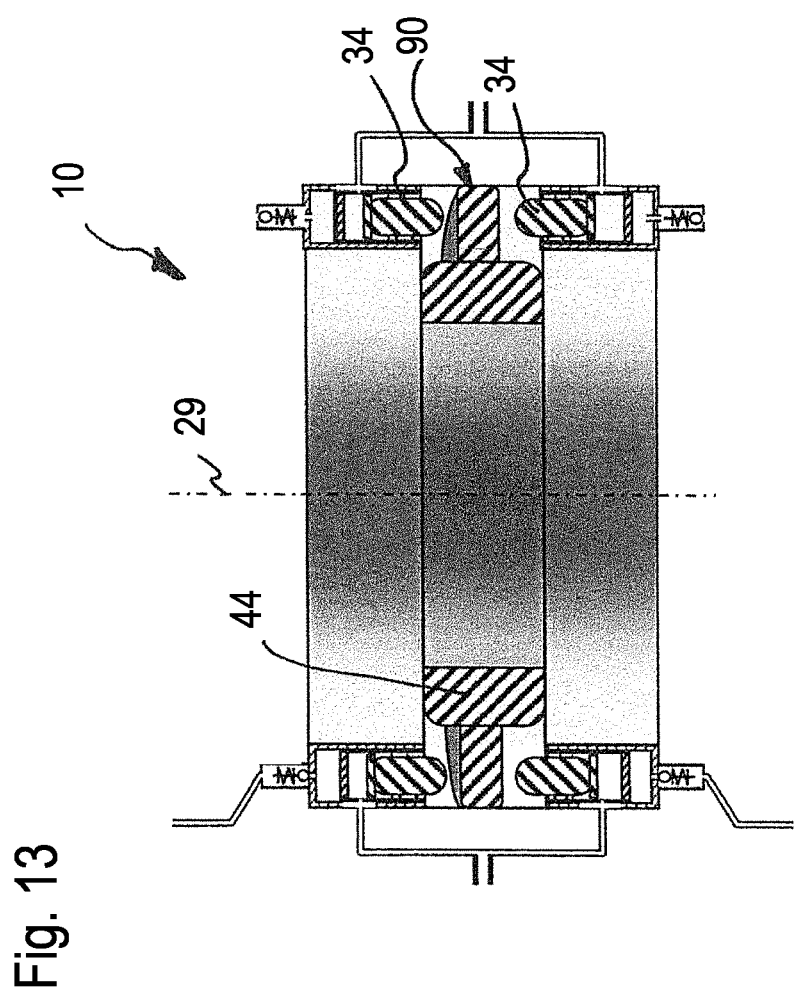
FIGS. 13 and 14 illustrate a compressor assembly according to another embodiment of the invention.

FIG. 13 shows another alternative embodiment of the compressor assembly 10 according to the invention. In the embodiment shown in FIGS. 13 and 14, the cylindrical cam 52 is in the form of a beaded cylindrical cam 90 instead of a cam track 50.

The beaded cylindrical cam 90 is grasped from above and below, seen in the direction of the axis of rotation 29, by a hub-side transmission component 34, when the compressor assembly conveys a pressure medium. This conveying state is shown in FIG. 14, while a freewheeling position of the compressor assembly 10 is shown in FIG. 13, in which the hub-side transmission components 34 are spaced apart from the beaded cylindrical cam 90.

The hub-side transmission components 34 are pretensioned by springs in the position shown in FIG. 13. In order to bring the compressor assembly 10 into a conveying state, a pressure medium is introduced into the pressure chamber 96 in the direction of the arrow 95. As a result, the hub-side transmission components 34 move toward the beaded cylindrical cam 90 and grasp these, as shown in 14. This state is maintained as long as the hub-side transmission components 34 are subjected to a pressure medium by the pressure chamber 96.

If the hub-side transmission components 34 are in contact with the beaded cylindrical cam 90, the annular pistons move up and down, as is illustrated by the arrow 98. A pressure medium is conveyed via the annular compression chamber. In doing so, the non-return valves 82 open in the discharge direction, and a pressure medium flows in the direction of the arrows 100. When the piston is in a suction phase, ambient air is suctioned in via the non-return valves 84 opening in the intake direction, as is illustrated by the arrow 102.

Figure 14:
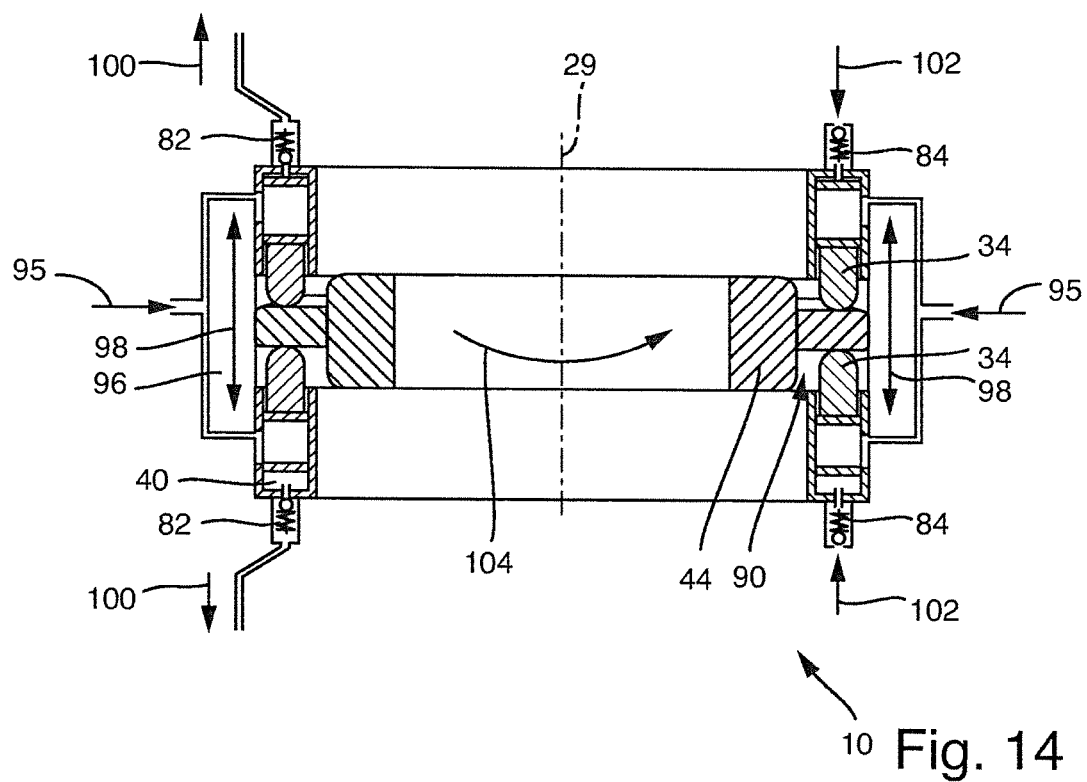

The rotation of the wheel mount-side transmission component 44 in relation to the components on the hub, or the hub-side components is indicated in FIG. 14 by the arrow 104.

Figure 15:
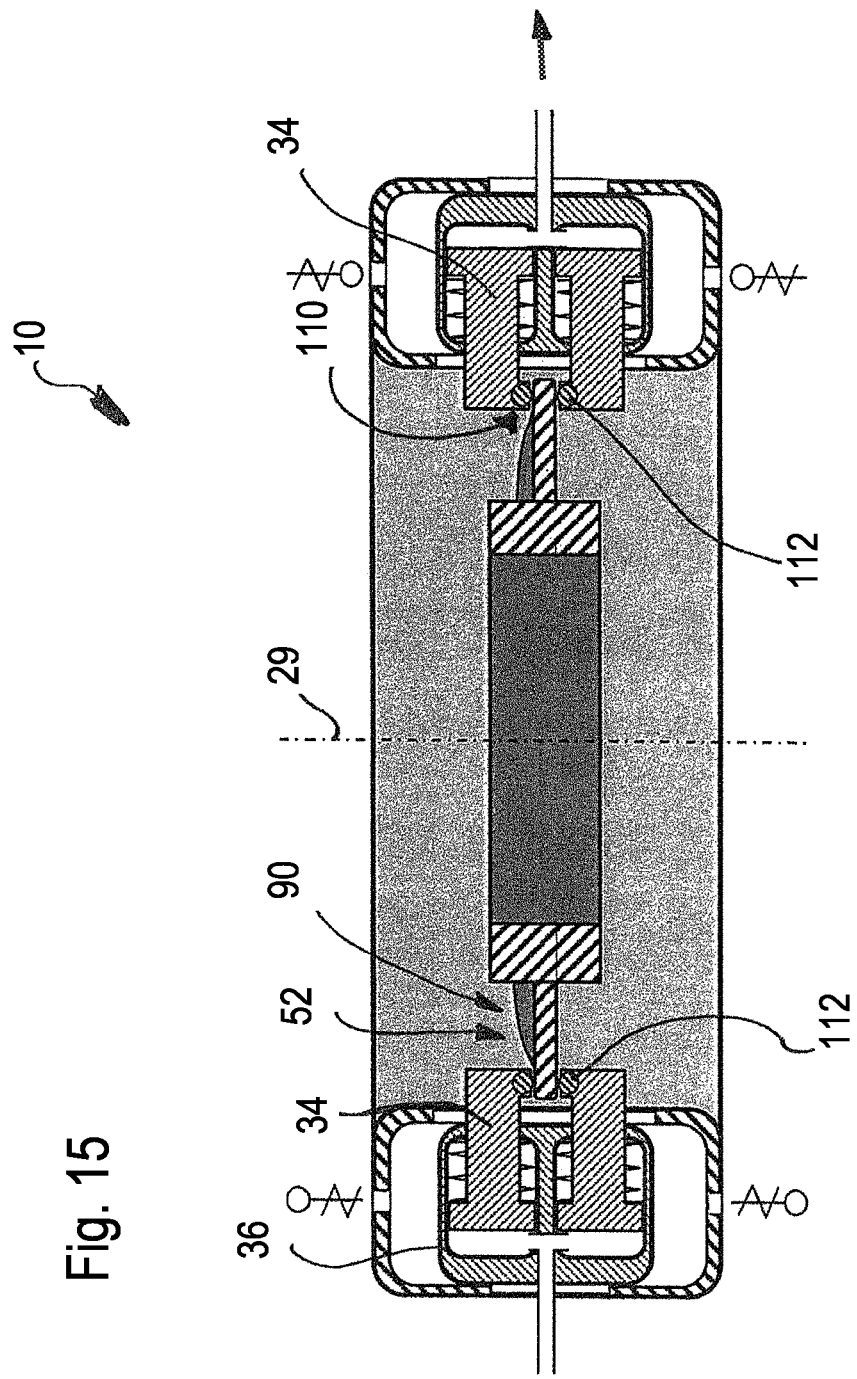
FIGS. 15 to 17 illustrate a compressor assembly according to another embodiment of the invention.

FIG. 15 shows another embodiment of the compressor assembly 10 according to the invention.

In this embodiment, the cylindrical cam 52 is in the form of a beaded cylindrical cam 90, as in the embodiment shown in FIGS. 13 and 14. The beaded cylindrical cam 90 in the embodiment shown in FIGS. 15 to 17 differs from the beaded cylindrical cam 90 shown in FIGS. 13 and 14 in that it has a circular disk section 110 on its radially outward surface.

The surfaces of the circular disk section 110 merge into a plane, seen in the direction of rotation 29, while the surfaces of the beaded cylindrical cam each run back and forth along the circumference in the direction of rotation 29 from these planes.

The hub-side transmission components 34 are in the form of forceps with roller elements 112, which grasp the beaded cylindrical cam 90 on the upper and lower surfaces, seen in the direction of rotation 29.

When the rolling elements 112 come in contact with the beaded cylindrical cam 90 at the circular disk section 110, the compressor component 36 does not move, because the hub-side transmission component 34 is not pushed toward the axis of rotation 29.

Figure 16:
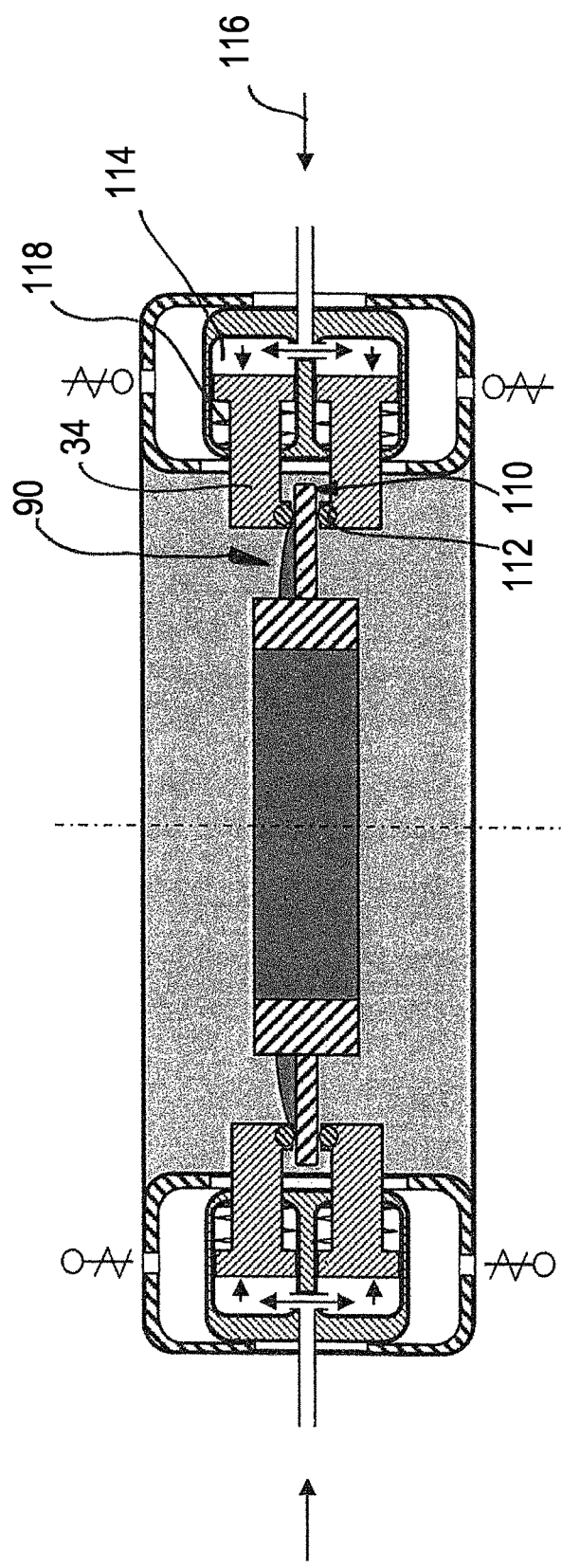

If a pressure medium is then introduced into the pressure chamber 114, as is indicated by an arrow 116 in FIG. 16, the hub-side transmission components 34 then move with their roller elements 112 radially inward, such that they are pushed from the circular disk section 110 to the beaded cylindrical cam 90.

A spring 118 that pretensions the hub-side transmission components 34 radially outward is compressed to such an extent, that the pressure of the pressure medium in the pressure chamber 114 cannot fully push the hub-side transmission components 34 radially inward. The pressure of the pressure medium in the pressure chamber 114 is provided by a connection with the tire cavity of the tire that is to be inflated. For this, the pressure chamber 114 is connected to the tire cavity via a coupling valve that opens when the tire pressure falls below a specific threshold value pressure. When a target pressure is reached, which is higher than the threshold value, this coupling valve closes, and the air is bled out of the line to the pressure chamber 114.

Figure 17:
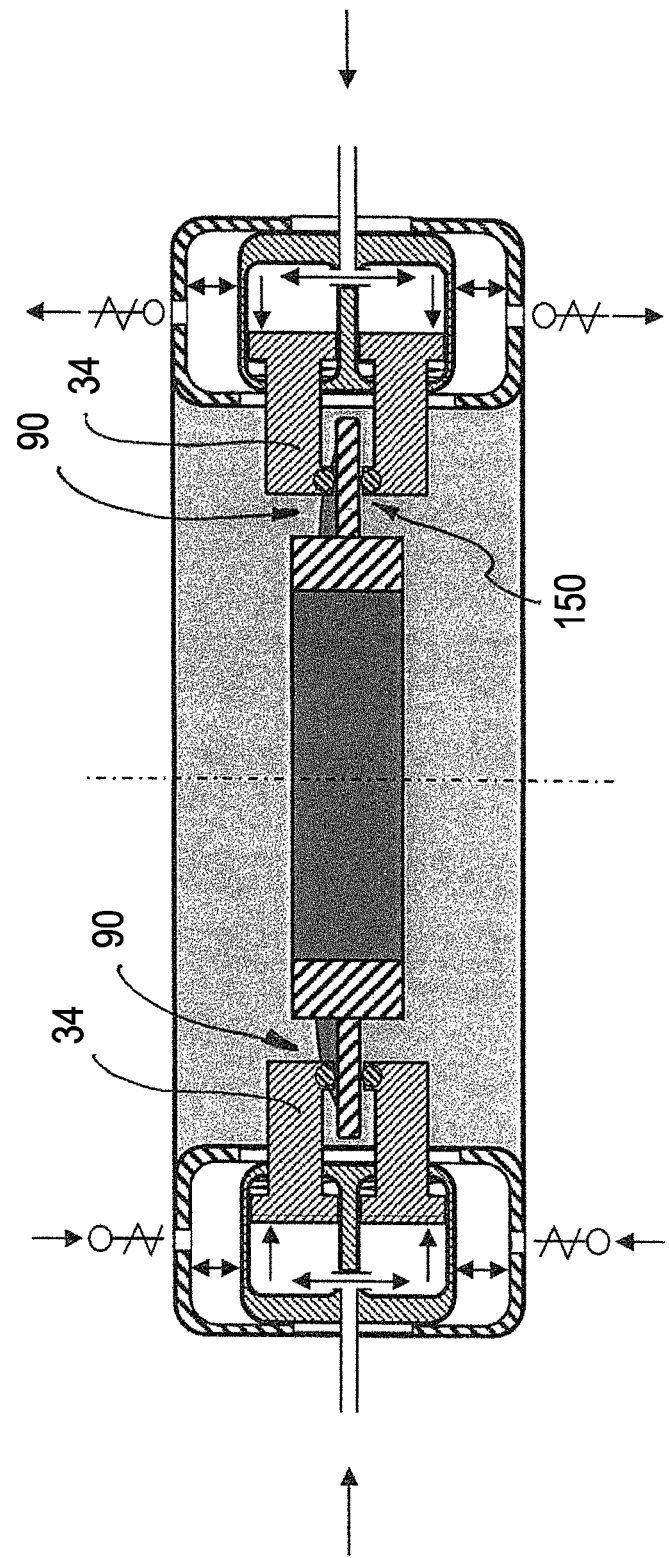

A state is shown in FIG. 17 in which the hub-side transmission components 34 are pushed up into their maximum deflection on the beaded cylindrical cam 90. Because the hub-side transmission components 34 do not have stops, and are tensioned radially outward by the spring 118, and pushed radially inward by the pressure of the pressure medium, their position is not precisely defined, such that the tire is not subjected to wear by the beaded cylindrical cam 90. The hub-side transmission components 34 have a variable contact section 150 with the beaded cylindrical cam 90.

It is also preferred in this embodiment that the forceps-like arms of the hub-side transmission components 34 can be moved apart when the hub-side transmission components are not subjected to a pressure, such that the roller elements 112 do not bear on the beaded cylindrical cam 90.

Figure 18:
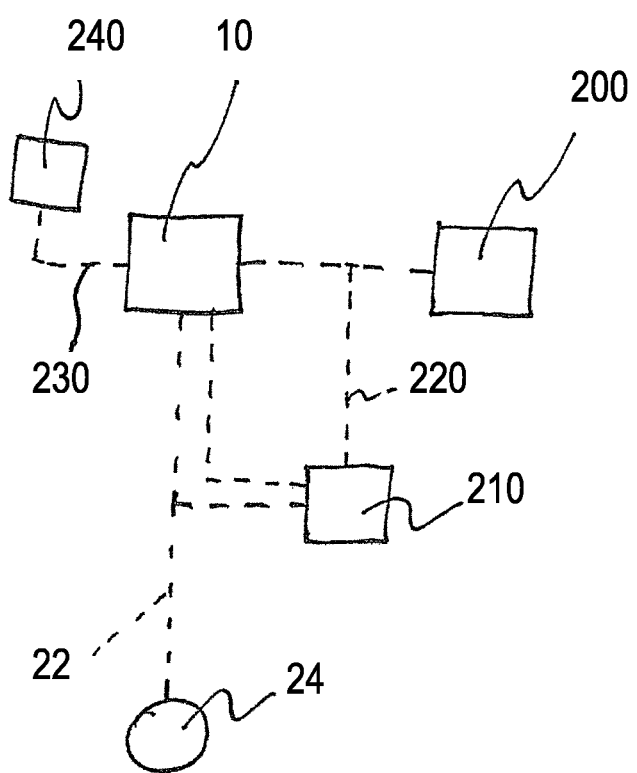
FIG. 18 shows a schematic illustration of a compressor assembly with a filter.

As is shown in FIG. 18, the compressor assembly 10 can be connected to a filter 200 and a control mechanism 210. The filter 200 is positioned such that it forms a fluid connection with the pressure medium intakes, or air intakes of the compressor assembly 10.

The control mechanism 210 can detect when the filter 200 is clogged via a measurement connection 220. If the control mechanism detects that the filter 200 is clogged, the filter can be cleaned in that it is subjected to a pressure medium, or air, in the other direction. In the normal operation of the compressor assembly 10, air is conveyed through the filter 200 toward the compressor assembly 10, and from there to the tire cavity 24. In a cleaning procedure, a pressure medium, or air, is either let out of the tire cavity 24, and conveyed through the filter 200 in the other direction, or the compressor assembly 10 conveys a pressure medium toward the filter 200, instead of the tire cavity 24. For this, the compressor assembly 10 suctions in the pressure medium in via an additional intake 230, which has an additional air filter 240 that can be cleaned in a similar manner.

Advantageously, the control mechanism 210 can be used to measure and/or indicate the pressure, temperature, and/or moisture of pressure medium in the tire cavity 24, wherein these functions are independent of the other functions of the control mechanism 210.

Figure 19:
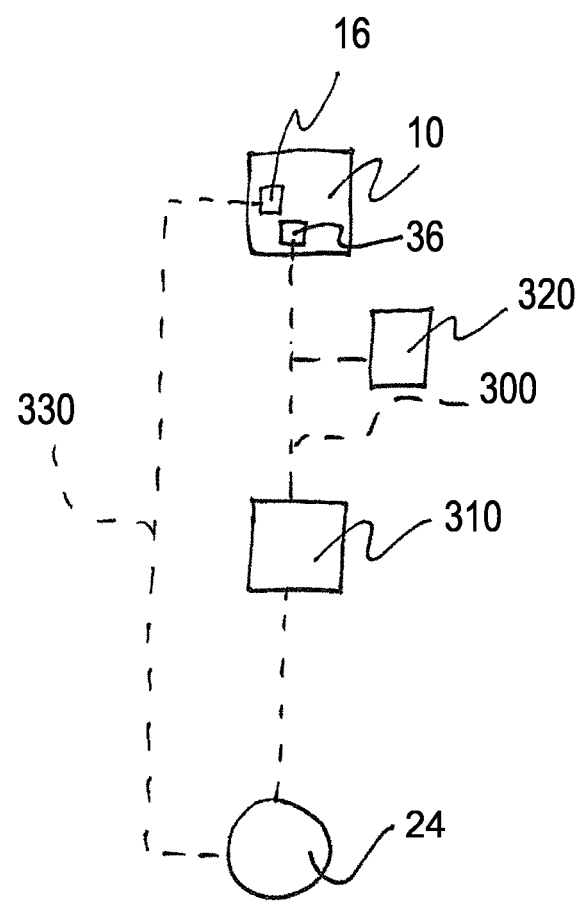
FIG. 19 shows a schematic illustration of a compressor assembly with a coupling valve.

An exemplary variation of the control of the coupling mechanism 62 is illustrated in FIG. 19. The coupling mechanism 62 can also be actuated electrically, electromagnetically, or electromechanically. For this, electric energy can be conducted from the main battery of the vehicle or from a generator therein, or some other energy source, to the hub-side via sliding contacts.

It is also conceivable to place a generator on the hub, which acquires electric energy from the rotational relative movement between the hub and the wheel mount. It is likewise conceivable to place rechargeable batteries on the hub, in particular in the spokes of the rim 1.

The compressor assembly 10, in particular the coupling mechanism 62 thereof, is connected to the tire cavity 24 via a coupling pressure medium line 300. There is a coupling valve 310 located in the coupling pressure medium line 300. There is also a relief valve 320 located on the coupling pressure medium line 300. The compression chambers 40, 42 of the compressor assembly 10 are connected to the tire cavity 24 via a line 330 for conveying the pressure medium.

The pressure medium of the tire cavity 24 is subjected to a pressure in the tires at the coupling valve 310. When the tire pressure falls below a tire pressure threshold value, the coupling valve 310 opens, by means of which the coupling mechanism 62 is actuated by means of the pressure medium from the tire cavity 24, and the hub-side transmission component 34 interacts with the wheel mount-side transmission component 44.

When the vehicle is driven, a rotational relative movement takes place between the hub and the wheel mount, and the pressure medium is conveyed from the compression chambers 40, 42 to the tire cavity 24 via the line 330 for conveying the pressure medium.

The coupling mechanism 300 and the line 330 for conveying the pressure medium can also collectively form a single line.

When a tire pressure target value is exceeded, which is preferably higher than the tire pressure threshold value, the coupling valve 310 closes, such that the coupling mechanism 62 is no longer subjected to the pressure medium. When the tire pressure target value is exceeded, the air is bled out of the coupling mechanism 62 via the coupling valve 310 or the relief valve 320. In this manner, it is ensured that the compressor assembly 10 immediately shuts down as soon as the pressure medium target value has been reached in the tire cavity 24.

This manner of operating the coupling mechanism 62 can be combined with all of the embodiments and individual aspects of these embodiments of the compressor assembly 10 in this application.

The invention claimed is:

1. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
at least one hub-side compression chamber (40, 42) including a volume that is altered by a translatory movement of a compressor component (36), wherein a pressure medium that is to be conducted into the tire cavity is pressurized by reducing the volume of the compression chamber (40, 42), and
a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52), and the first transmission component (44) is located radially inward of the second transmission component (34).

2. The compressor assembly (10) according to claim 1, wherein the first transmission component (44) comprises a groove-like cam track (50).

3. The compressor assembly (10) according to claim 2, wherein the second transmission component (34) comprises a pin-like engagement element (48) that engages the cylindrical cam (52) in the groove-like cam track (50).

4. The compressor assembly (10) according to claim 1, wherein the second transmission component (34) comprises a tappet output drive.

5. The compressor assembly (10) according to claim 1, wherein the translatory movement of the compressor component (36) takes place at least in part in a direction of the axis of rotation (29).

6. The compressor assembly (10) according to claim 1, wherein the cylindrical cam (52) has at least one curved surface (72), which runs toward the axis of rotation in at least a portion of a curve seen from a radial perspective (66).

7. The compressor assembly (10) according to claim 1, wherein the first transmission component (44) comprises a groove-like cam track (50), wherein the cam track (50) has two opposing curved surfaces (72), each of which runs toward the axis of rotation in at least a portion of curves seen from a radial perspective (66).

8. The compressor assembly (10) according to a claim 1, further comprising a compression chamber (40, 42) located, seen along the axis of rotation (29), in front of and behind a contact section of the second transmission component (34) having the cylindrical cam (52).

9. The compressor assembly (10) according to claim 1, wherein the second transmission component (34) is movable to a position interacting with the first transmission component (44) through a translatory movement in a radial direction (66).

10. The compressor assembly (10) according to claim 1, wherein the second transmission component (34) is moved to a position interacting with the first transmission component (44) through a rotational movement about the radial direction (66).

11. The compressor assembly (10) according to claim 1, further comprising two second transmission components (34) that are diametrically opposed in relation to the axis of rotation (29).

12. The compressor assembly (10) according to claim 1, further comprising a coupling mechanism (62) configured to bring the second component (34) into interaction with the first transmission component (44).

13. The compressor assembly (10) according to claim 1, further comprising a measuring and/or indicating mechanism (210) connected to the tire cavity (24) by a pressure medium line (22), the mechanism (210) measuring and/or indicating a pressure, temperature, and/or moisture of the pressure medium in the tire cavity (24).

14. The compressor assembly (10) according to claim 1, further comprising a filter (200) at a pressure medium intake end.

15. The compressor assembly (10) according to claim 14, wherein the pressure medium from the tire cavity (24) or by conveying the pressure medium through the compressor assembly (10), cleans the filter (200).

16. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
at least one hub-side compression chamber (40, 42) including a volume that is altered by a translatory movement of a compressor component (36), wherein a pressure medium that is to be conducted into the tire cavity is pressurized by reducing the volume of the compression chamber (40, 42),
a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52), wherein the second transmission component (34) comprises an engagement element (48) that engages in the cylindrical cam (52), wherein the engagement element (48) has a cross section at an end (70) facing the first transmission component (44), an extension of which broadens, seen from a radial perspective (66).

17. The compressor assembly (10) according to claim 16, wherein the first transmission component (44) is located radially inward of the second transmission component (34).

18. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
at least one hub-side compression chamber (40, 42) including a volume that is altered by a translatory movement of a compressor component (36), wherein the compressor component 36 comprises an annular piston 38, and wherein a pressure medium that is to be conducted into the tire cavity is pressurized by reducing the volume of the compression chamber (40, 42), and
a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52).

19. The compressor assembly (10) according to claim 18, wherein the first transmission component (44) is located radially inward of the second transmission component (34).

20. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
at least one hub-side compression chamber (40, 42) including a volume that is altered by a translatory movement of a compressor component (36), wherein a pressure medium that is to be conducted into the tire cavity is pressurized by reducing the volume of the compression chamber (40, 42),
a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52), and
a coupling mechanism (62) configured to bring the second transmission component (34) into interaction with the first transmission component (44), wherein the coupling mechanism (62) is configured such that the second transmission component (34) is pretensioned in a position that does not interact with the first transmission component (44).

21. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
at least one hub-side compression chamber (40, 42) including a volume that is altered by a translatory movement of a compressor component (36), wherein a pressure medium that is to be conducted into the tire cavity is pressurized by reducing the volume of the compression chamber (40, 42),
a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52), and
a coupling mechanism (62) configured to bring the second transmission component (34) into interaction with the first transmission component (44), wherein the coupling mechanism (62) is actuated pneumatically, magnetically, or electromechanically.

22. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
- at least one hub-side compression chamber (40, 42) including a volume that is altered by a translatory movement of a compressor component (36), wherein a pressure medium that is to be conducted into the tire cavity is pressurized by reducing the volume of the compression chamber (40, 42),
- a transmission (33) configured to convert a rotational movement between the wheel mount and the hub to an oscillating translatory movement of the compressor component (36) through an interaction of a first transmission component (44) that does not rotate relative to the wheel mount (16) with a second transmission component (34) rotatable with the wheel hub (18), wherein the first transmission component (44) comprises a cylindrical cam (52), and
- a coupling mechanism (62) configured to bring the second transmission component (34) into interaction with the first transmission component (44), wherein the coupling mechanism (62) is actuated by the pressure medium in the tire cavity (24).

23. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
- at least one hub-side compression chamber (40, 42) including a volume that is altered by a translatory movement of a compressor component (36), wherein a pressure medium that is to be conducted into the tire cavity is pressurized by reducing the volume of the compression chamber (40, 42),
- a transmission (33) configured to convert a rotational movement between the wheel mount and the hub to an oscillating translatory movement of the compressor component (36) through an interaction of a first transmission component (44) that does not rotate relative to the (16) with a second transmission component (34) rotatable with the wheel hub (18), wherein the first transmission component (44) comprises a cylindrical cam (52), and
- a coupling valve (70, 310) configured to convey a fluid between a coupling mechanism (62) and the tire cavity (24), against which the pressure medium from the tire cavity (24) bears, and which opens when the tire pressure falls below a tire pressure threshold value to actuate the coupling mechanism (62) by the pressure medium from the tire cavity (24), and the second transmission component (34) interacts with the first transmission component (44).

24. The compressor assembly (10) according to claim 23, wherein the coupling valve (70) closes when a tire pressure exceeds a tire pressure target value, which is higher than a tire pressure threshold value, wherein the coupling mechanism (62) is no longer subjected to the pressure medium, wherein the air is bled out of the coupling mechanism (54) by the coupling valve (70, 310) or a relief valve (74, 320) when the tire pressure exceeds the tire pressure target value.

* * * * *